(12) United States Patent
Saranow et al.

(10) Patent No.: US 7,963,303 B2
(45) Date of Patent: Jun. 21, 2011

(54) MANUAL HAIR DYE APPARATUS AND METHOD FOR USING THE SAME

(75) Inventors: Mitchell H. Saranow, Winnetka, IL (US); Charles C. Mayberry, Harvard, IL (US)

(73) Assignee: The Saranow Group, LLC, Northbrook, IL (US)

( * ) Notice: Subject to any disclaimer, the term of this patent is extended or adjusted under 35 U.S.C. 154(b) by 95 days.

(21) Appl. No.: 12/396,050

(22) Filed: Mar. 2, 2009

(65) Prior Publication Data

US 2009/0218007 A1 Sep. 3, 2009

Related U.S. Application Data

(60) Provisional application No. 61/033,053, filed on Mar. 3, 2008, provisional application No. 61/115,960, filed on Nov. 19, 2008.

(51) Int. Cl.
*B65B 1/30* (2006.01)
(52) U.S. Cl. ............. 141/95; 141/83; 141/104; 141/198
(58) Field of Classification Search ............ 141/18, 141/94, 95, 100, 104, 105, 198, 83; 222/58, 222/132, 145.1
See application file for complete search history.

(56) References Cited

U.S. PATENT DOCUMENTS

| | | | |
|---|---|---|---|
| 4,469,146 A * | 9/1984 | Campbell et al. | ............... 141/9 |
| 4,656,600 A * | 4/1987 | Swann | ........................ 702/173 |
| 5,163,010 A | 11/1992 | Klein et al. | |
| 5,493,840 A | 2/1996 | Cane | |
| 6,089,408 A | 7/2000 | Fox | |
| 6,935,386 B2 | 8/2005 | Miller et al. | |
| 7,185,789 B2 | 3/2007 | Mink et al. | |
| 7,557,311 B2 * | 7/2009 | Umemoto | ................. 177/25.16 |
| 2005/0264794 A1 * | 12/2005 | Inzinna et al. | ................. 356/45 |
| 2007/0044863 A1 | 3/2007 | Engels et al. | |
| 2007/0084520 A1 | 4/2007 | Driessen et al. | |

FOREIGN PATENT DOCUMENTS

| | | |
|---|---|---|
| EP | 1093842 | 4/2001 |
| WO | WO 02-083282 | 10/2002 |
| WO | WO 03-090914 A2 | 11/2003 |

* cited by examiner

*Primary Examiner* — Timothy L. Maust
*Assistant Examiner* — Jason K Niesz
(74) *Attorney, Agent, or Firm* — Adam Sacharoff; Much Shelist

(57) ABSTRACT

In one embodiment of the present system invention, the operator enters the customer name into the color management system and the computer screen displays the customer's history. If this is a new customer, a history file is created. The operator selects desired color from the color pallet, enters the required amount of finished dye and finally the activator strength is selected. The operator is instructed to place an empty batch container on the scale. The system prompts the operator for the first dye color, and an LED adjacent to the corresponding drawer is illuminated. The operator manually adds the amount indicated on the display panel, while the scale monitors exactly how much has been added and provides feedback to the operator leading to an extremely accurate dispense. After returning the bottle or tube to the designated storage bin, the operator presses "next", and the next LED is illuminated along with the required amount of the next ingredient. Bar code readers can also be used to control the ingredient solution and control process. The system automatically adds the required activators from the internal storage reservoirs. A batch record is placed in the customers history file.

30 Claims, 14 Drawing Sheets

MANUAL HAIR DYE APPARATUS AND METHOD FOR USING THE SAME

CROSS REFERENCE TO RELATED APPLICATIONS

The present application claims priority to U.S. Provisional Application Ser. No. 61/033,053 filed Mar. 3, 2008 and U.S. Provisional Application Ser. No. 61/115,960 filed Nov. 19, 2008. Both provisional applications are incorporated by reference.

FIELD OF THE INVENTION

The present invention relates to hair dye preparation or blending apparatus, or more particular to a computer driven semi-automatic or manual apparatus for mixing dyes to produce an exact color of a hair dye.

BACKGROUND OF THE INVENTION

Currently, hair dye producers' package hair dyes in small tubes and bottles. They further provide a salon with a recipe chart that show how much of ingredient "A" is to be mixed with how much of ingredients "B" and "C" and "D" to produce the desired end color. To produce the desired color, the colorist must first locate the required ingredients. This can be a challenge unto itself at a busy salon with multiple colorists. In addition, with as many as 60+ ingredients per colorant line, using the correct materials is very important. The next step is to squeeze or pour the approximately amounts of each ingredient into a mixing bowl. Corse measurement devices and techniques are used, so it is a process with very little control over the end product. This current method employed by most salons lacks precision and control to ensure the correct results. Stock color recipes are listed on a color chart provided by the colorant manufacturer. Color formulations are often adjusted to suit a particular customer needs. These custom colors are typically recorded on 3×5 cards or other manually prepared means and filed away for future reference. The drawbacks to this approach include: inaccurate volumetric means (" . . . add ½ capful . . . " "Squeeze tube to line . . . "); end results are highly dependent on operator skill level; no controls are available to monitor outcomes; and customer records hand-written with no backup. This creates a cluttered and disorganized process.

Fully-automatic dispensers designed for hair coloring materials were introduced in the 1990's to address the weaknesses of the current hand-mixing process. These dispensers automatically measured the correct amount of each ingredient with great precision and a software database stored the stock color recipes as well as specially created blends. Since the formulation and customer information were stored electronically, locating the required information was quick and easy. Files could also be backed up so valuable customer history data was more secure and easily shared with other locations. However, the earlier dispensers required specially-designed internal storage bags for the various color components. The bags typically held one quart and were specially constructed to eliminate the possibility of air infiltration, which would oxidize and ruin the dye. Bulk packaging required less user maintenance by salon personnel, but required manufacturers to incur sizeable capital costs to add additional filling lines at great cost to the manufacturer to accommodate the special bags. Major drawbacks of the fully automatic offerings included their high cost, complexity with high maintenance requirements, costly for hair color producers to adopt due to specialized packaging requirements. Therefore, there is a need for a process which is a simpler more cost-effective approach and which eliminates the drawbacks of earlier designs.

There is a need to provide a monitorial approach, coupled with accurate measurement means to eliminate the potential for error and improve the overall color accuracy. Optional features include product bins, drawers, or shelves to reduce clutter, more easily locate the required ingredients, and to help manage and protect inventory. Other options include the automatic metering of the most commonly used ingredients to accelerate the mixing process.

SUMMARY OF THE INVENTION

One ore more of the embodiments in the present invention aims to bring control to an otherwise un-controlled process at a substantial reduction of cots (about 60-70%). One ore more of the current embodiments solves a problem that has existed for over 15 years. The complete system includes a computer driven blending system with precision scale, a computer-based recipe management system, optional storage to manage and protect color blending ingredients, and an optional self contained pumping system to add common activators and peroxides. Additional options include bar code readers and magnetic card scanning. Every system has a blending station with the Company's proprietary Color Management Software. The Blending station includes a keyboard, LCD screen and an electronic scale to provide feedback on exactly how much of a each ingredient has actually been added to the batch. A complete system also contains a specially designed storage drawers to organize and store the individual blending dyes. Each drawer would have an LED indicator to simplify product selection which is driven by the control system and/or an electronically controlled latch mechanism. In addition, the system can be enhanced with an optional bar code reader to verify the ingredients against the color recipe and automated dispensing of the desired activators.

In one embodiment there is provided a system for preparation of a hair dye mixture. The system includes a computer control system having at least a memory, input controls, and a display, the memory having the capacity to store and/or storing at least one hair dye mixture formulated from the mixing of one or more colorants and/or dye blending materials. The system also includes a scale connected to the control system, where the control system monitors a weight of the scale and provides information on changes thereto. In addition, the computer control system upon receiving an input for a creation of a hair dye mixture displays a formulation of the hair dye mixture indicating the colorant(s) and amount(s) needed to create the hair dye mixture.

In another aspect of the embodiment, there is provided a computer control system which monitors changes in the weight of the scale and adjusts the formulation when a weight of a colorant manually added to the hair dye mixture is different than a recommended formulated amount and the computer control system receives an input to accept the different weight of the colorant. The computer control system may also monitor changes in the weight of the scale and displays a difference between a recommended formulated amount of a colorant and an amount of the colorant added to the scale. The differences displayed may also be measured down to a zeroed amount left to indicate how much additional colorant is needed to be added to the scale to reach the recommended formulated amount of the colorant. The computer control system may also be linked to a salon management software to exchange information on customers and formulations of hair dye mixtures associated to said customers. The computer control system may store in the memory any changes in the formulation of the hair dye mixture. The computer control system may also store in the memory any changes in the formulation of the hair dye mixture and sends the changes in the formulation of the hair dye mixture to the salon management software. Yet in other aspects, the control system may adjust the formulation of a hair dye mixture upon receiving an input on a total amount of mixture required or a strength of the mixture. Yet further aspects provides for receiving an input that the hair dye mixture is a custom color, the control system further displays a listing of colorants and dye blending materials, illuminates indicator(s) for particular selected colorant (s), monitors a separate amount and a total amount of the colorants placed in the bowl, automatically dispenses selected amounts of dye blending materials, and stores a formulated hair dye mixture upon receiving an input the mixture is completed.

In another embodiment of the present system invention, the operator enters the customer name into the color management system and the computer screen displays the customer's history. If this is a new customer, a history file is created. The operator selects desired color from the color pallet, enters the required amount of finished dye and finally the activator strength is selected. The operator is instructed to place an empty batch container on the scale. The system prompts the operator for the first dye color, and an LED adjacent to the corresponding drawer is illuminated or the drawer is automatically opened. The operator manually adds the amount indicated on the display panel, while the scale monitors exactly how much has been added and provides feedback to the operator leading to an extremely accurate dispense. After returning the bottle or tube to the designated storage bin, the operator presses "next", and the next LED is illuminated along with the required amount of the next ingredient. Bar code readers can also be used to control the ingredient solution and control process. The system automatically adds the required activators from the internal storage reservoirs. A batch record is placed in the customers history file.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1A:
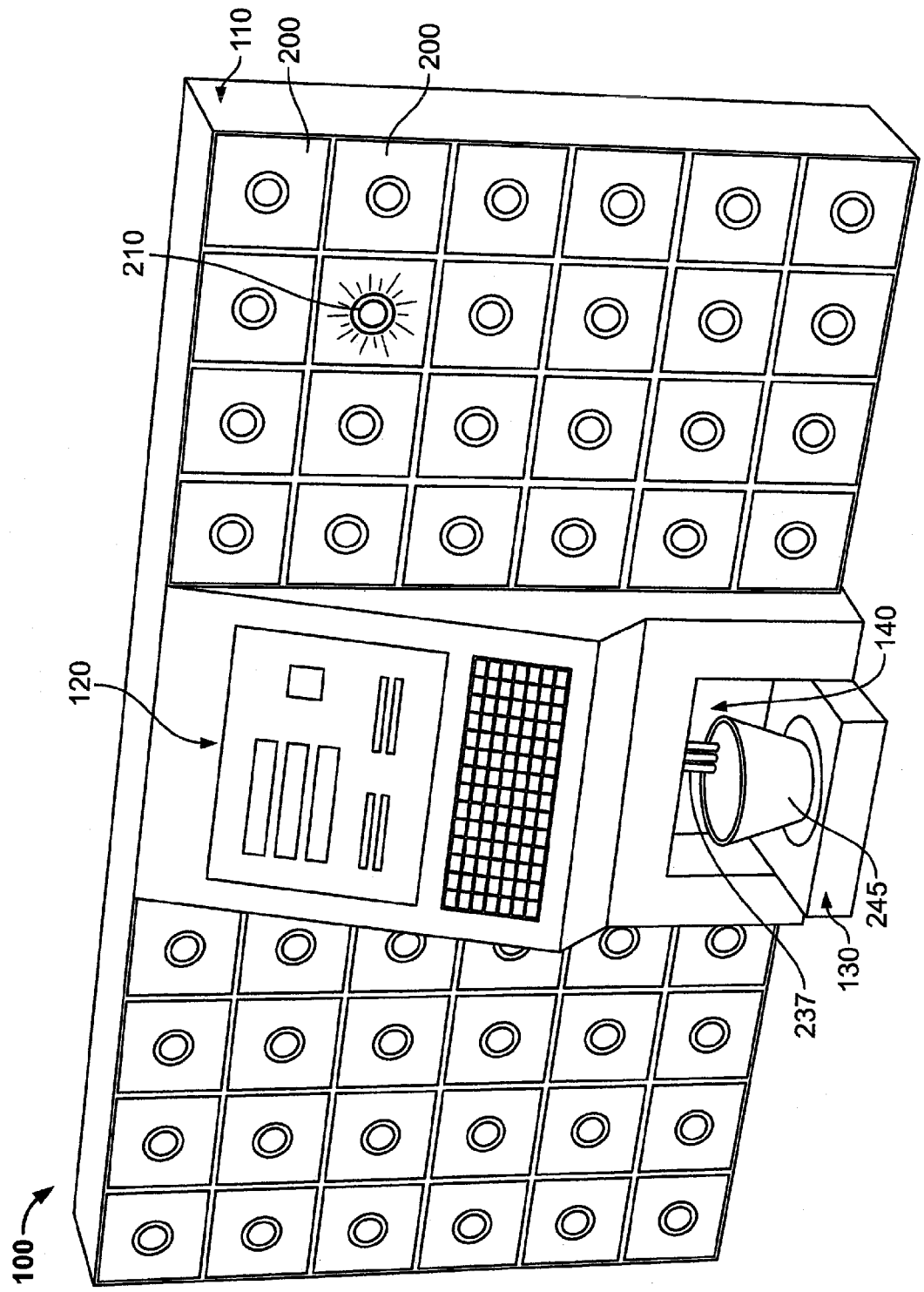
FIG. 1A is a perspective view of one embodiment of the system designed to control a manual process for mixing hair dyes, which includes a mixing station and optional storage bins.

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the invention, claims and/or embodiments illustrated.

Figure 1B:
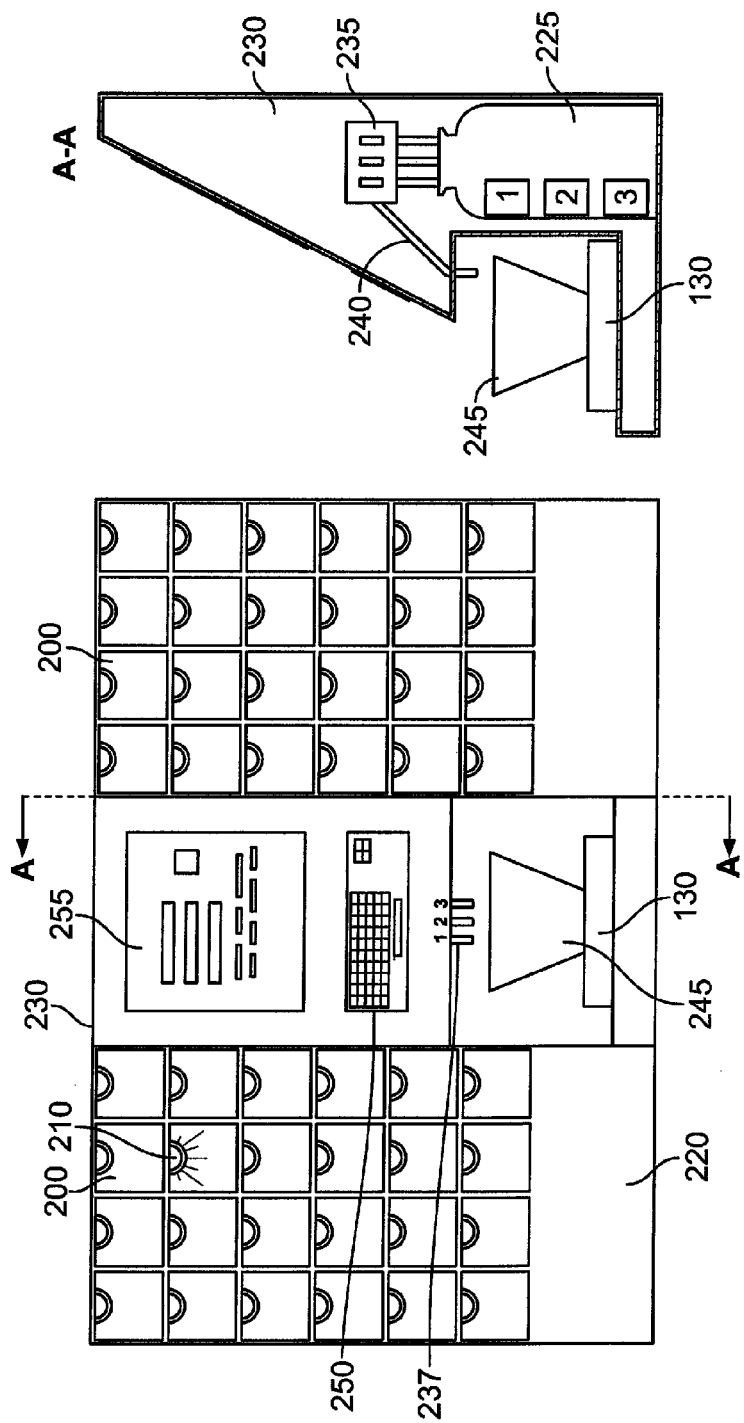
FIG. 1B is a first and cross sectional view of the embodiment from FIG. 1A.
Figure 2:
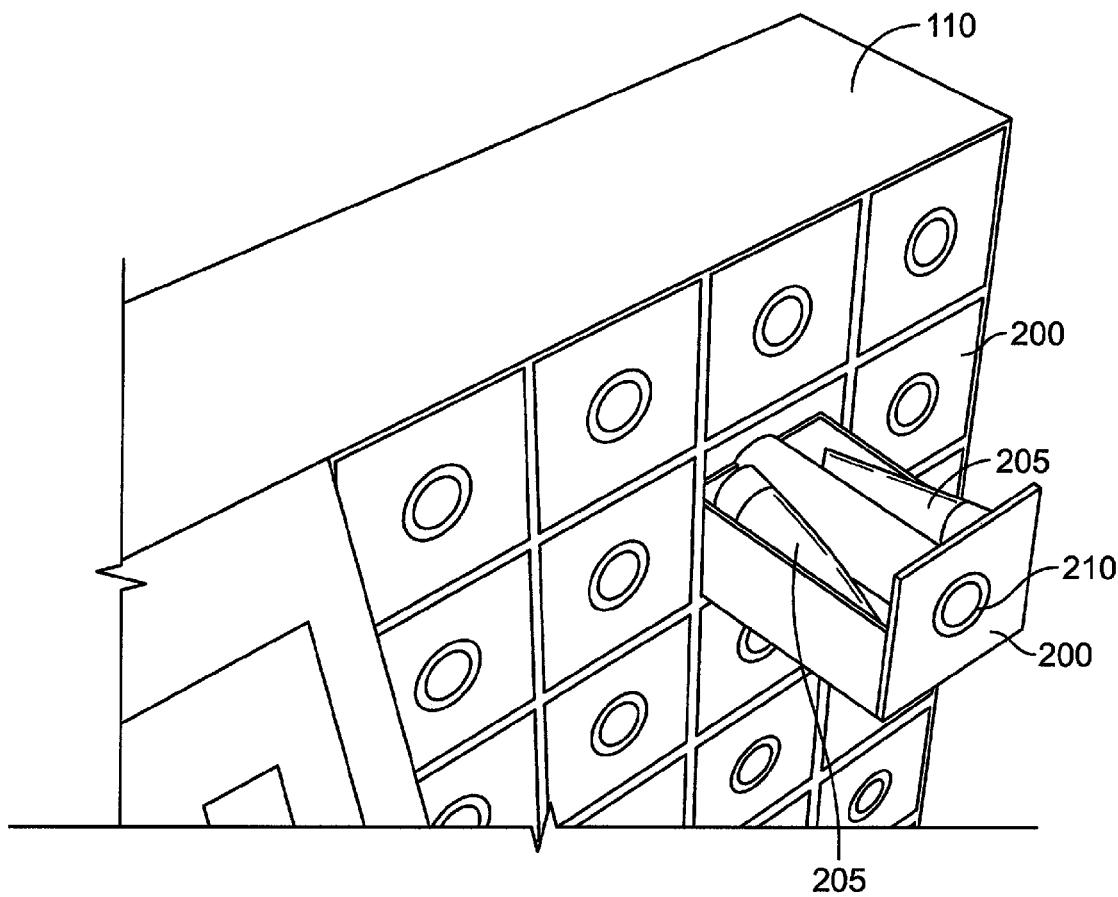
FIG. 2 is an enlarged view of a bin from FIG. 1A showing storage areas for the hair dye tubes.

In a first embodiment of the invention, there is shown and described a system designed to control a manual apparatus and process for mixing hair dyes and which brings control to an otherwise un-controlled process. FIG. 1 shows one embodiment of the system, generally referenced as number 100. The system 100 includes organized storage of the color blending ingredients 110, a computer-based recipe management system 120, a small electronic scale 130 to monitor the color blending process, and a self contained pumping system 140 to add the common activators and peroxides.

As shown in FIGS. 1-13, a number of different embodiments of the system 100 are illustrated. Each system 100 contains a number of drawers or bins 200 to organize and store the individual blending dye containers/tubes 205. Each bin/drawer 200 has an associated LED indicator 210 driven by the control system 220. Several small reservoirs 225 of common bases and additives are stored within a center storage area 230. The reservoirs 225 are coupled with metering pumps 235 to measure the common bases and additives which eject from nozzles 237 into a mixture batch. Pumping channels 240 are also automatically controlled by the control system 220. Lastly, a small digital scale 130 is electrically connected to the control system 220 to help provide feedback to the control system 220 on exactly how much of a given ingredient was added to the mixture batch. As illustrated, the common bases and additives are automatically pumped into a mixing bowl 245.

One embodiment of the present invention would be as follows:

(a) an operator enters/views the customer name or other identifying characteristic into the control system 220 via an integral keyboard 250 and display panel 255;

(b) the control system 220 has a memory storing customer information and/or history of the customer's color scheme; the control system similarly allows editing, adding, and deleting of customer information;

(c) the operator may either select a previously stored desired finished dye color from the customer history, or from an available list of known color pallets;

(d) the operator is then prompted to enter the required amount of finished dye (for example whether the operator needs 1 ounce, 2 ounces, etc.;

(d) the operator is instructed to place an empty batch container or mixing bowl 245 on the scale 130;

(e) the control system 220 will then illuminate an LED indicator 210 adjacent to a corresponding bin/drawer prompting the operator to a specific dye color needed for the dye color; optionally the control system may control locking mechanisms on the bins to electronically open the desired storage bin;

(f) the operator manually adds the amount of dye color that is indicated on the display panel 255 to the bowl 245; while the amount is being added, the computer system 220 monitors the scale 130 to determine exactly how much is and has been added; the display panel 255 indicates how close the addition is to the target weight by displaying how much more must be added and provides feedback to the operator;

(g) after returning the bottle or tube to the designated storage bin, the operator presses "next" (or any key specified by the computer system), and the next bin LED is illuminated along with the required amount of the next ingredient;

(h) steps (f) and (g) are repeated until all of the required colors have been added;

(i) the control system 220 may then automatically add the exact amount of required activators and peroxides from the internal storage reservoirs 225; and (j) once the batch has been completed, the precise amount of all ingredients are recorded into the customers history file.

Had this been a custom color blend, a separate software function would be selected. Under this function, the operator would tell the system which ingredients were being added, and the system would record the exact amount of each addition via the integrated scale. When the batch was complete, a record of the custom blend would be stored in the customers history file.

It is herein noted that any type of computer control system having a memory storage area, processor to run various programs, and other components well known in the computer industry can be used by the embodiments herein. The control system can be wired or wirelessly communicating with the plurality of bins to control the LED indicators 210 or other lighting, electronic locks, and/or sound elements to help identify the specific bin(s) the operator will be using to mix the specific color scheme. The control system is further wired or wirelessly communicating with the metering pumps to control the amount of common bases and additives pumped into the bowl 245. Further, the control system is wired or wirelessly communicating with the electronic scale 130 and the monitor 255 to identify and display to the operator how much of a specific amount of dye needs to be added next into the bowl 245.

On return visits, information stored would be available to precisely re-create the dye color. This concept revolutionizes the way hair dye is produced in hair salons around the world. It replaces a messy, uncontrolled mixing process with an easy-to-use, guided process to produce the exact color of hair dye time after time.

Figure 3:
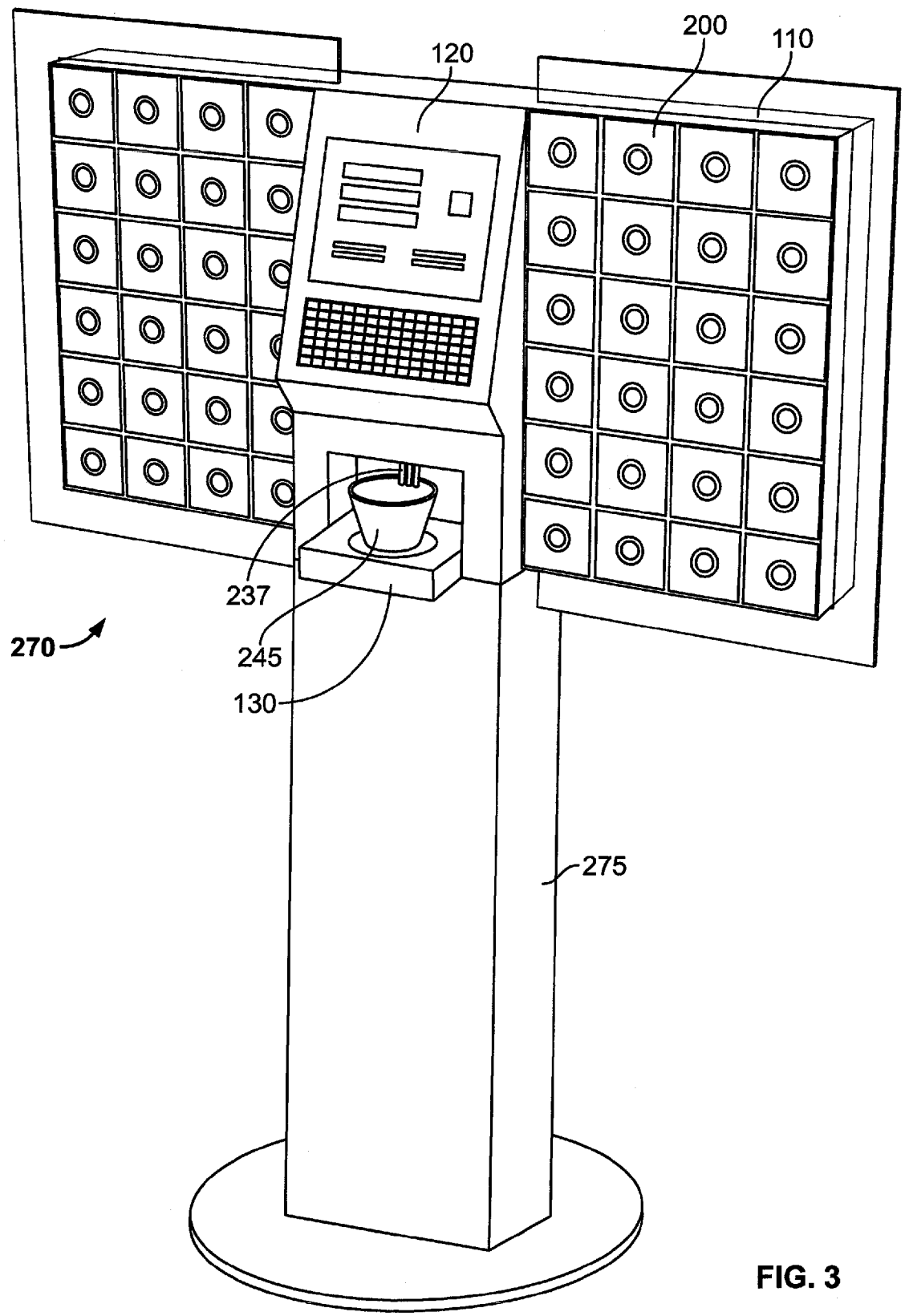
FIG. 3 is a perspective view of one embodiment of the system designed to control a manual process for mixing hair dyes, illustrated the use on a pedestal.
Figure 4:
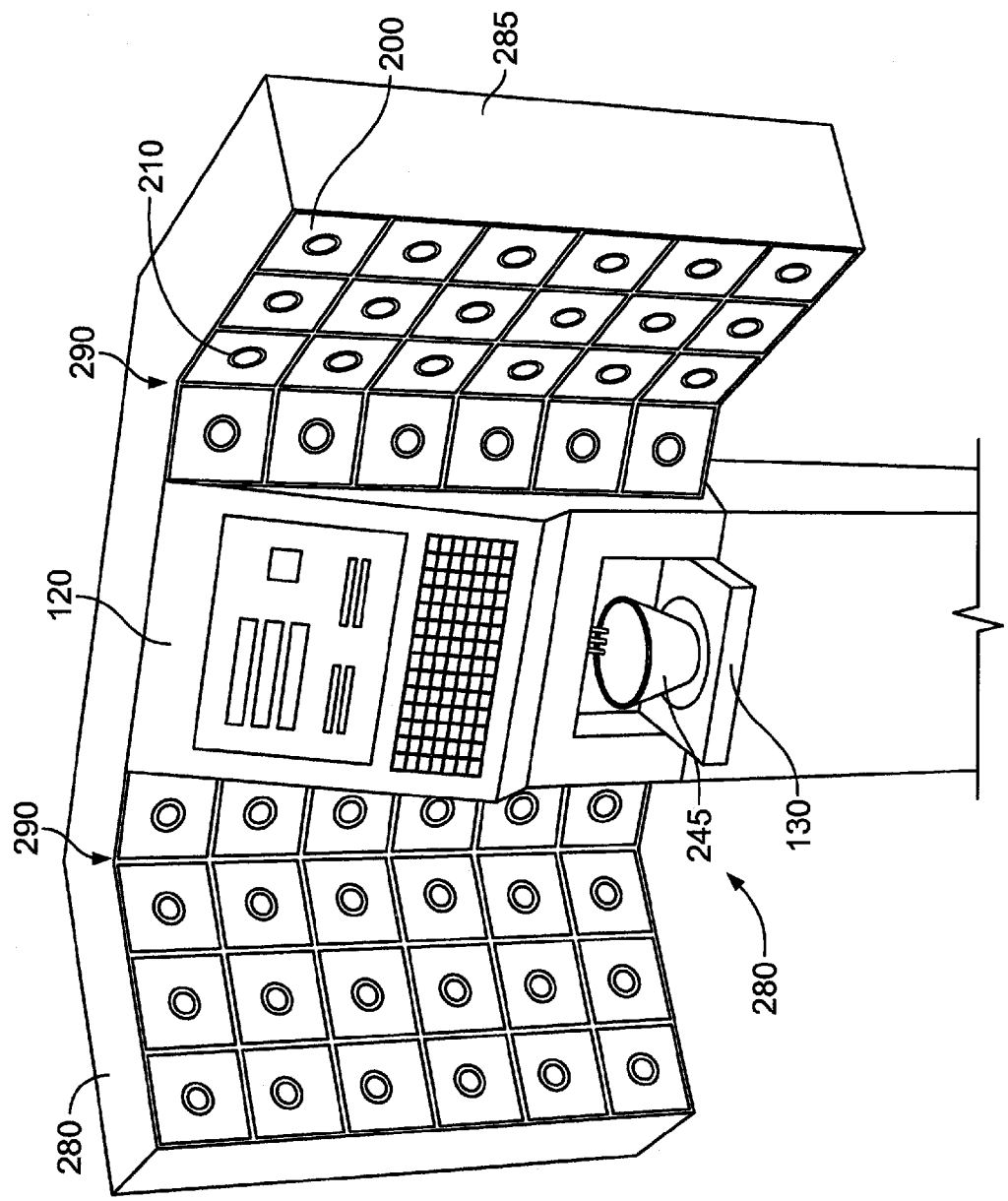
FIG. 4 is a perspective view of one embodiment of the system designed to control a manual process for mixing hair dyes, illustrated the use of curved bin storage areas.
Figure 5:
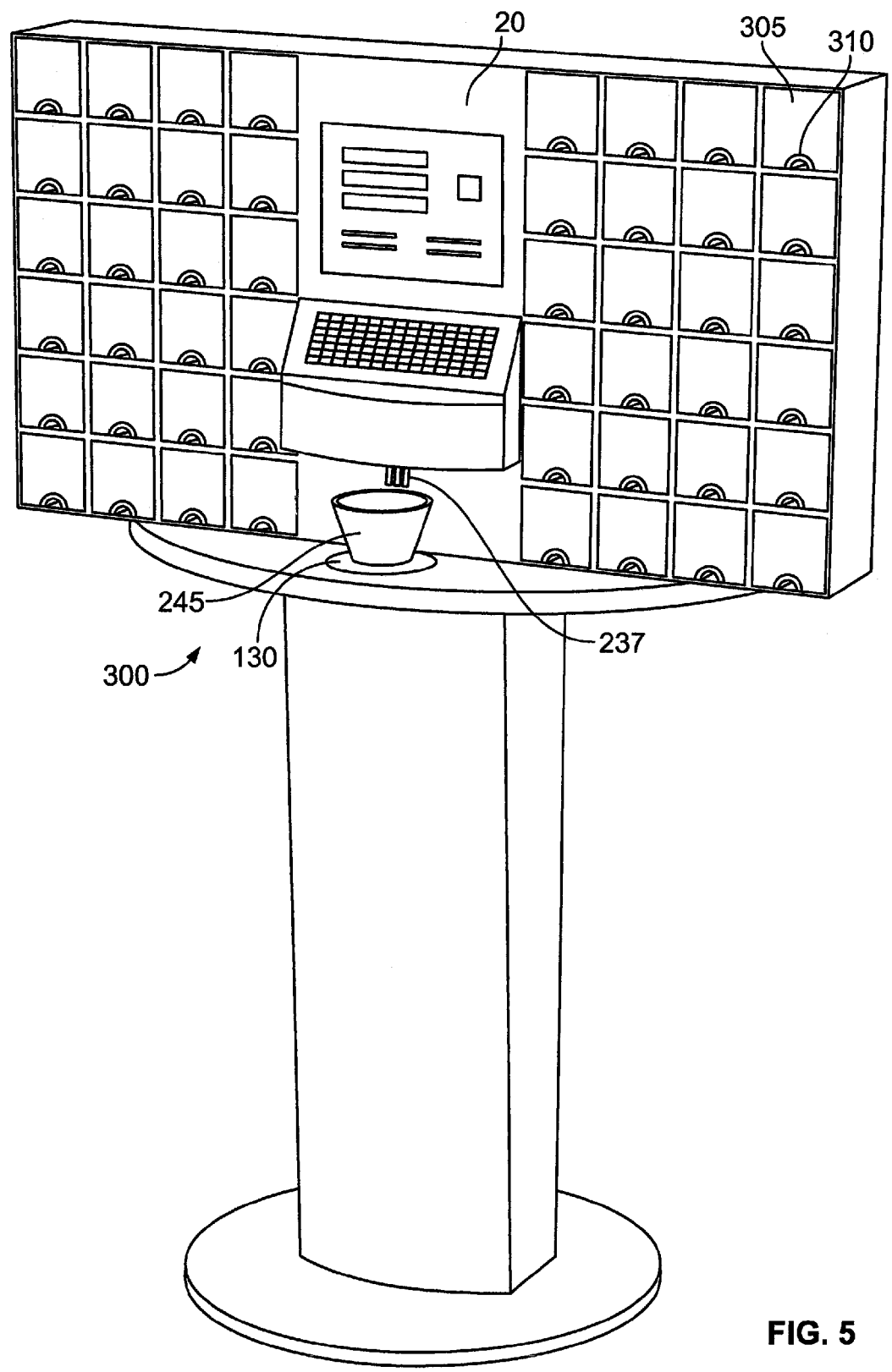
FIG. 5 is a perspective view of one embodiment of the system designed to control a manual process for mixing hair dyes, illustrated the use of bins with a change in the LED indicators.
Figure 6:
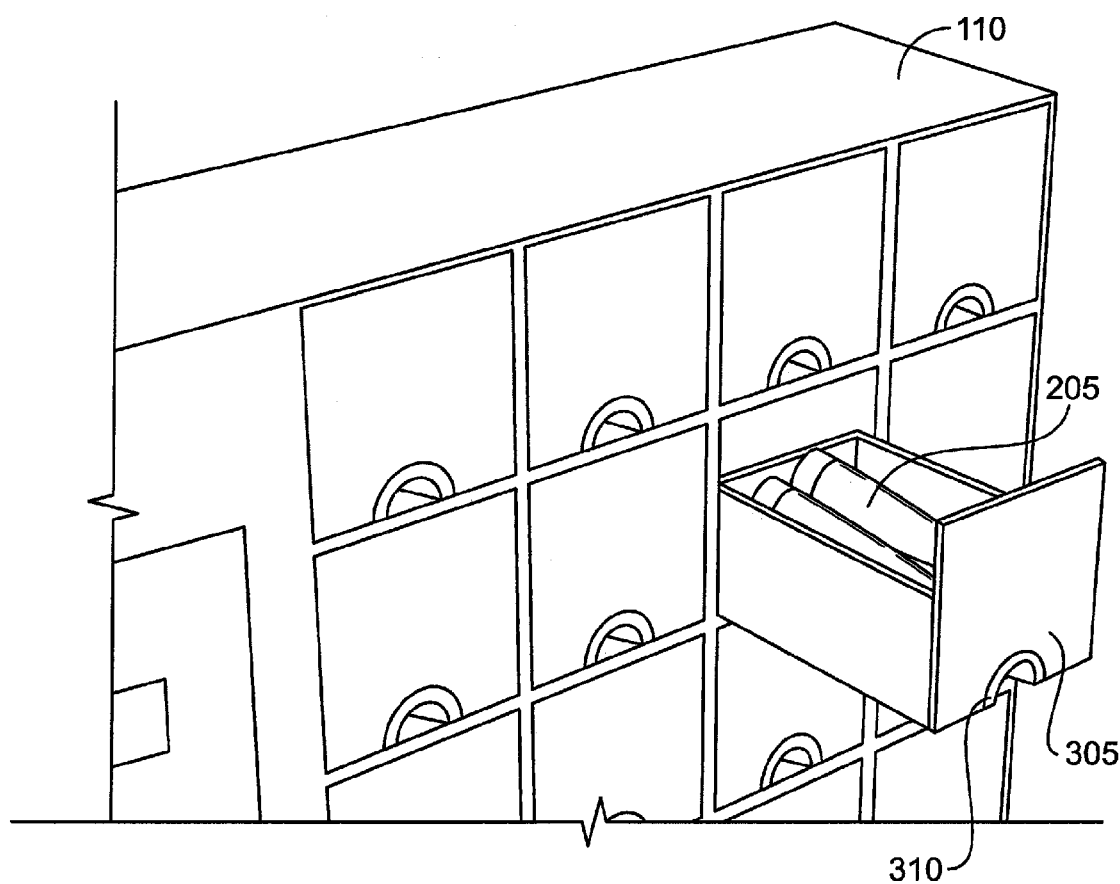
FIG. 6 is an enlarged view of a bin from FIG. 5.

The systems can be designed in various manners. For example as illustrated in FIG. 1, the system is a counter-top model, while FIG. 3 shows a free standing model 270 with a stand 275 so the system can stand on the floor. FIG. 4 shows a corner top model 280 with storage bin areas 285 that have curved sections 290. In FIGS. 5-6 an alternative system 300 is shown with bins 305 that include LED indicators 310 on the bottom of each bin (as opposed to in the center, shown in the previous embodiments). In addition, in each embodiment the storage bins can be an optional piece to the system inventions.

Figure 7:
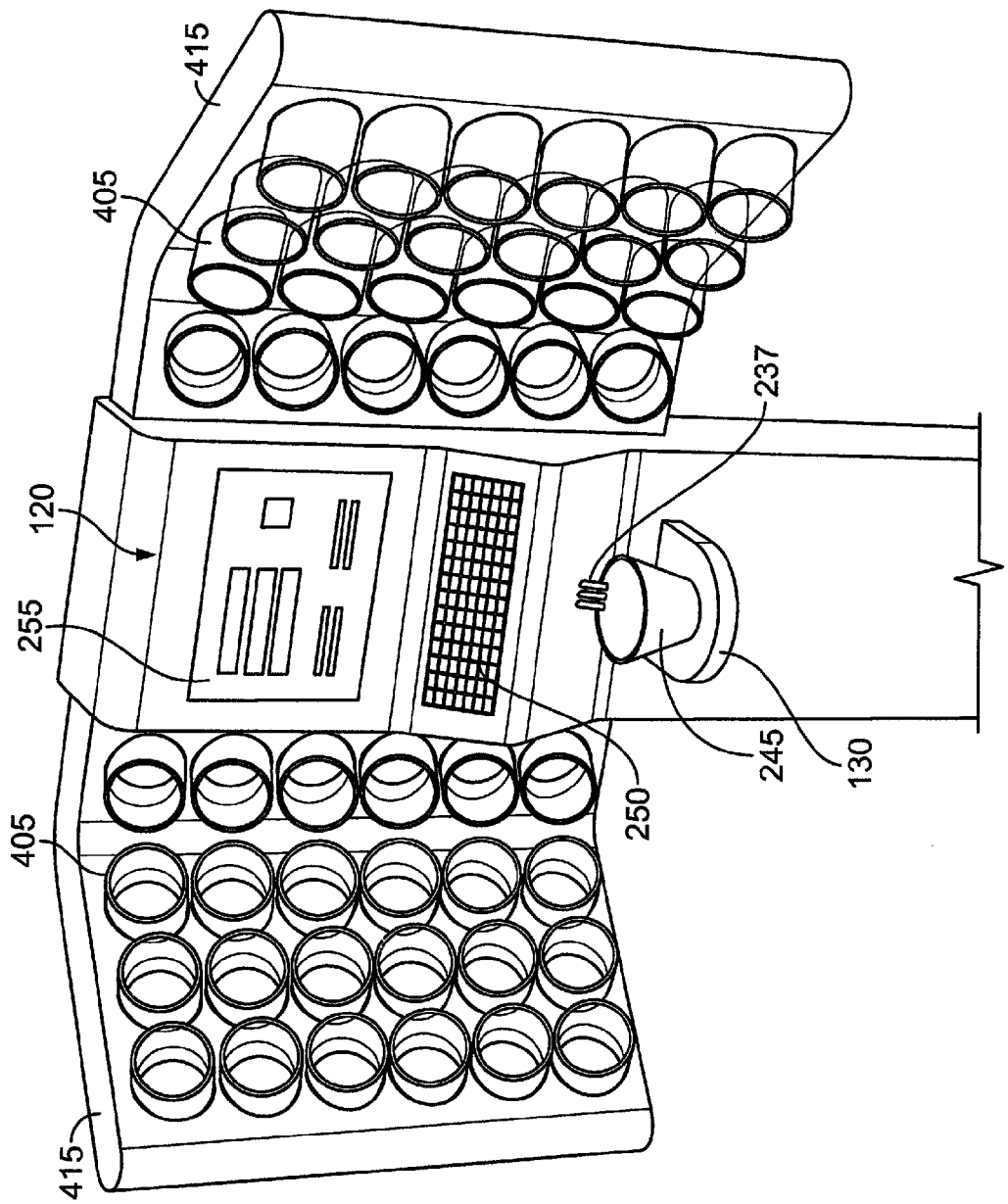
FIG. 7 is a perspective view of one embodiment of the system designed to control a manual process for mixing hair dyes, illustrated the use of slotted tubes as opposed to bins.
Figure 8:
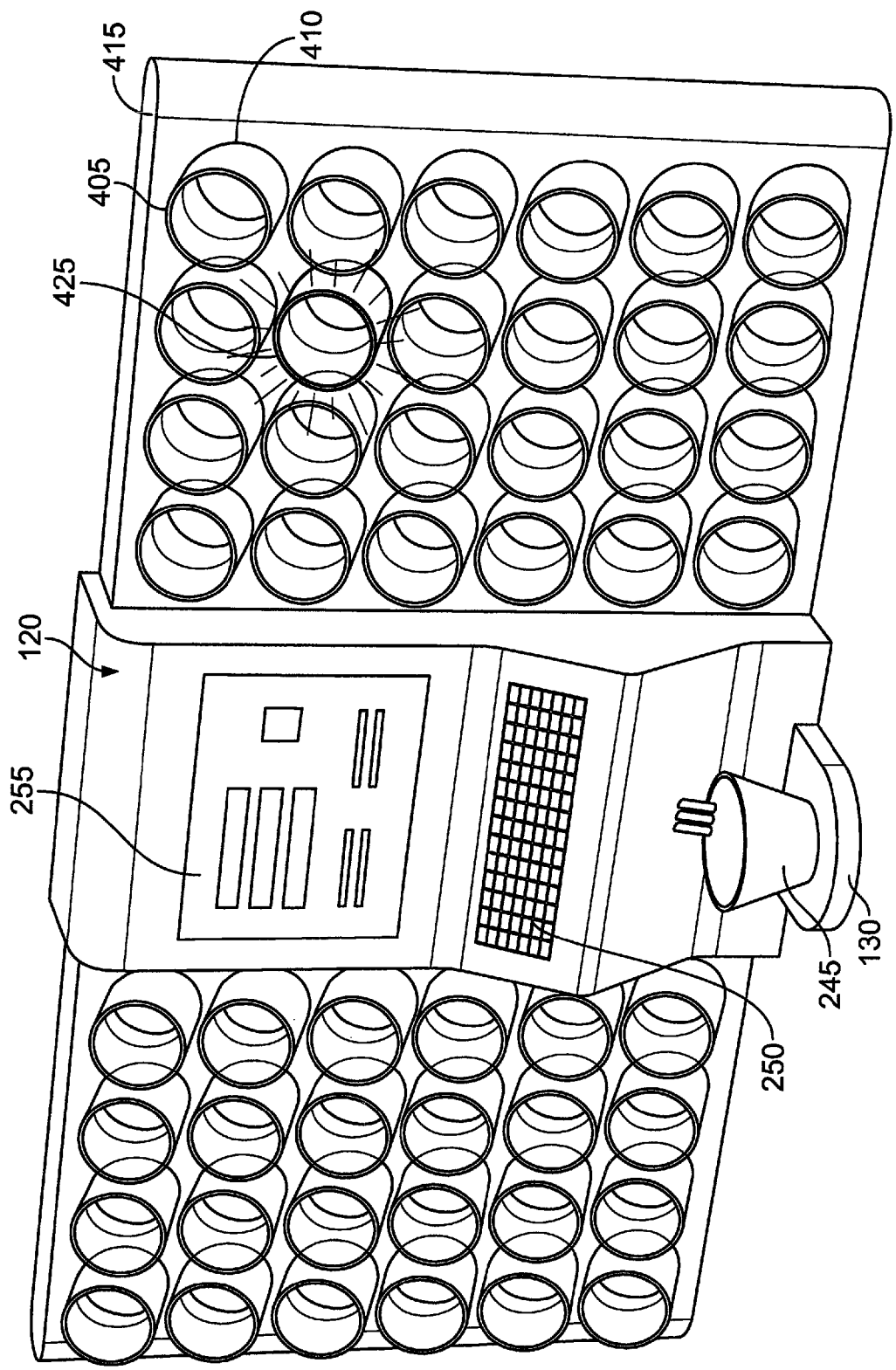
FIG. 8 is a perspective view of one embodiment of the system designed to control a manual process for mixing hair dyes, illustrated the use of slotted tubes as opposed to bins.
Figure 9:
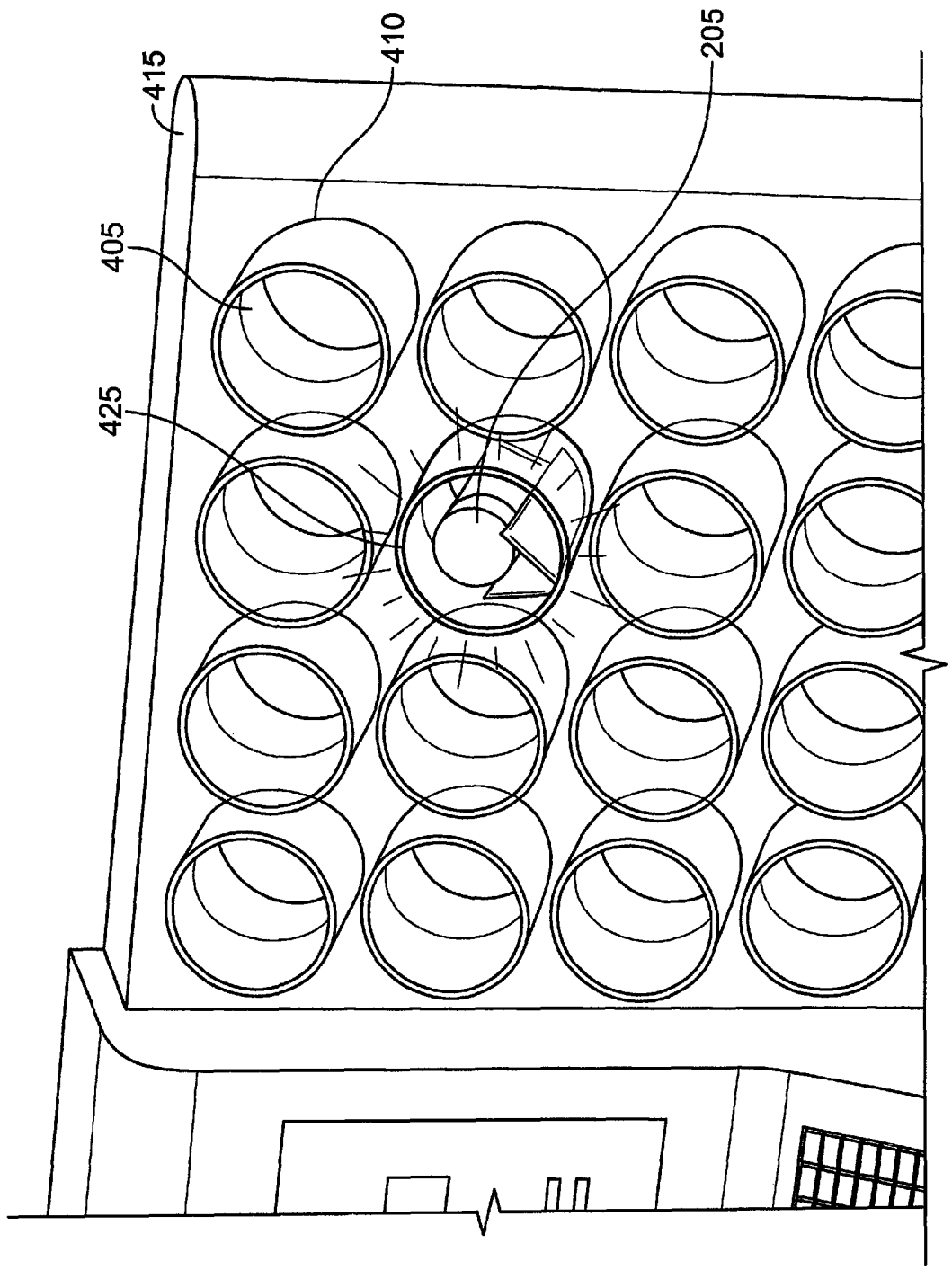
FIG. 9 is an enlarged view of the slotted tubes from FIG. 7 or FIG. 8.
Figure 11:
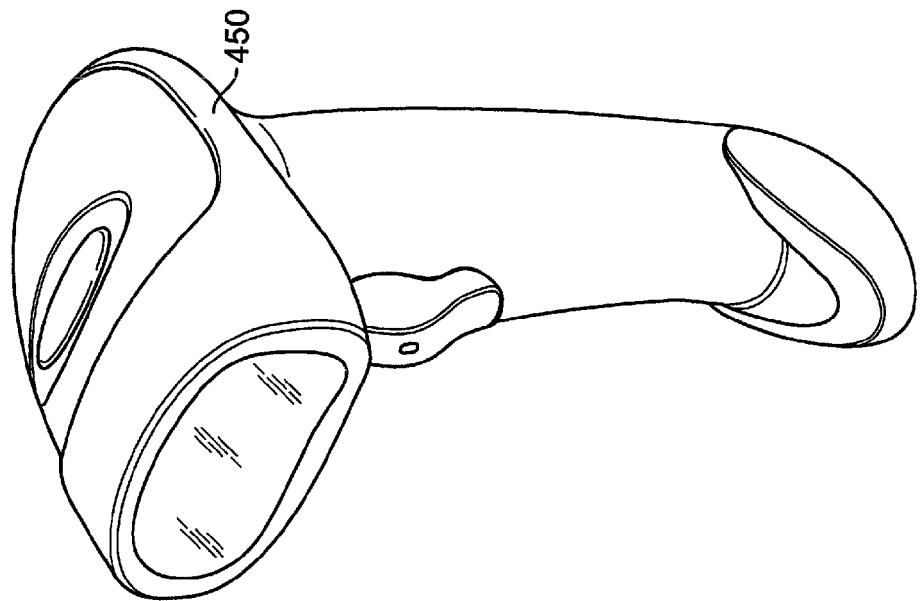
FIG. 11 is a perspective view of a bar code scanner used in one or more of the system embodiments.
Figure 10:
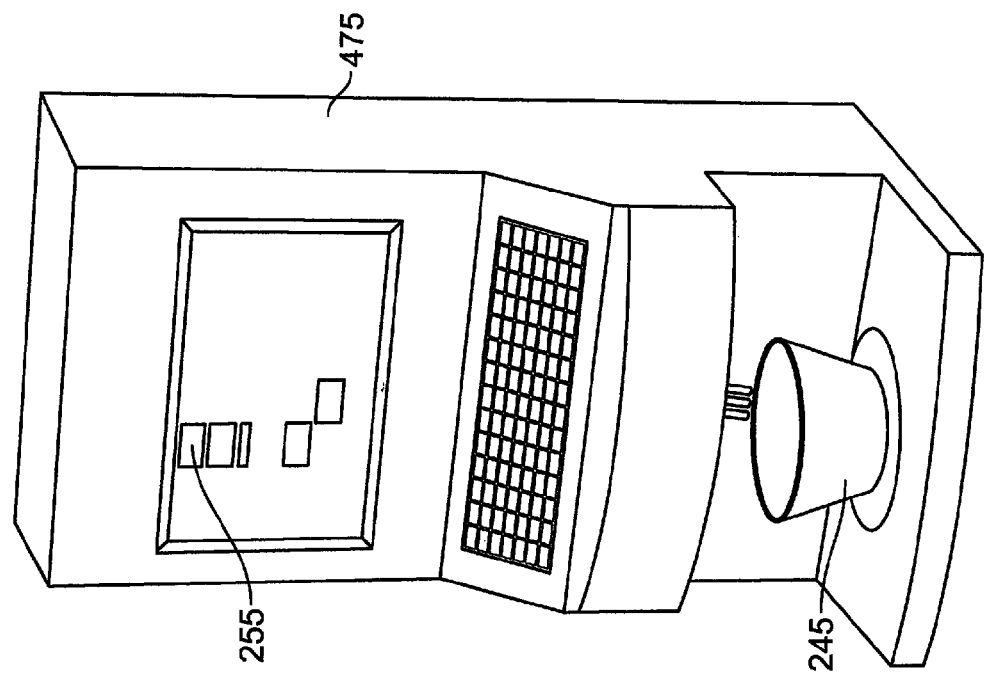
FIG. 10 is a perspective view of one embodiment of the system designed to control a manual process for mixing hair dyes.
Figure 12:
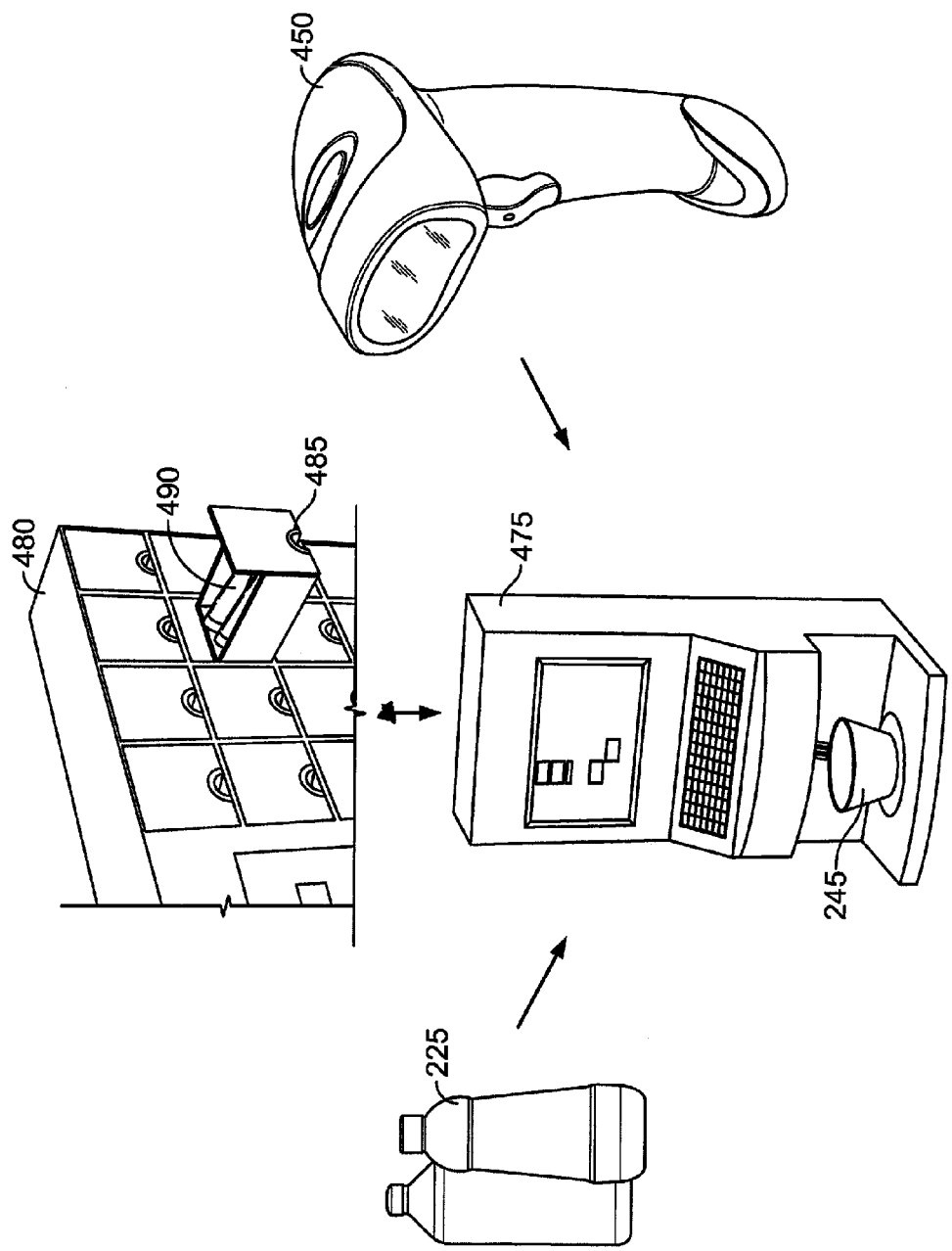
FIG. 12 is a perspective view of one embodiment of the system designed to control a manual process for mixing hair dyes, illustrated a modular system with at least detached storage bins.

In FIGS. 7-9, a system 400 is shown that includes the same components and functionality as the previous embodiments, except the bins are replaced with opened tube structures 405 that are secured into openings 410 on the side storage areas 415. The ends 420 of the tubes would include an LED indicator 425 controlled by the control system 220.

Figure 14:
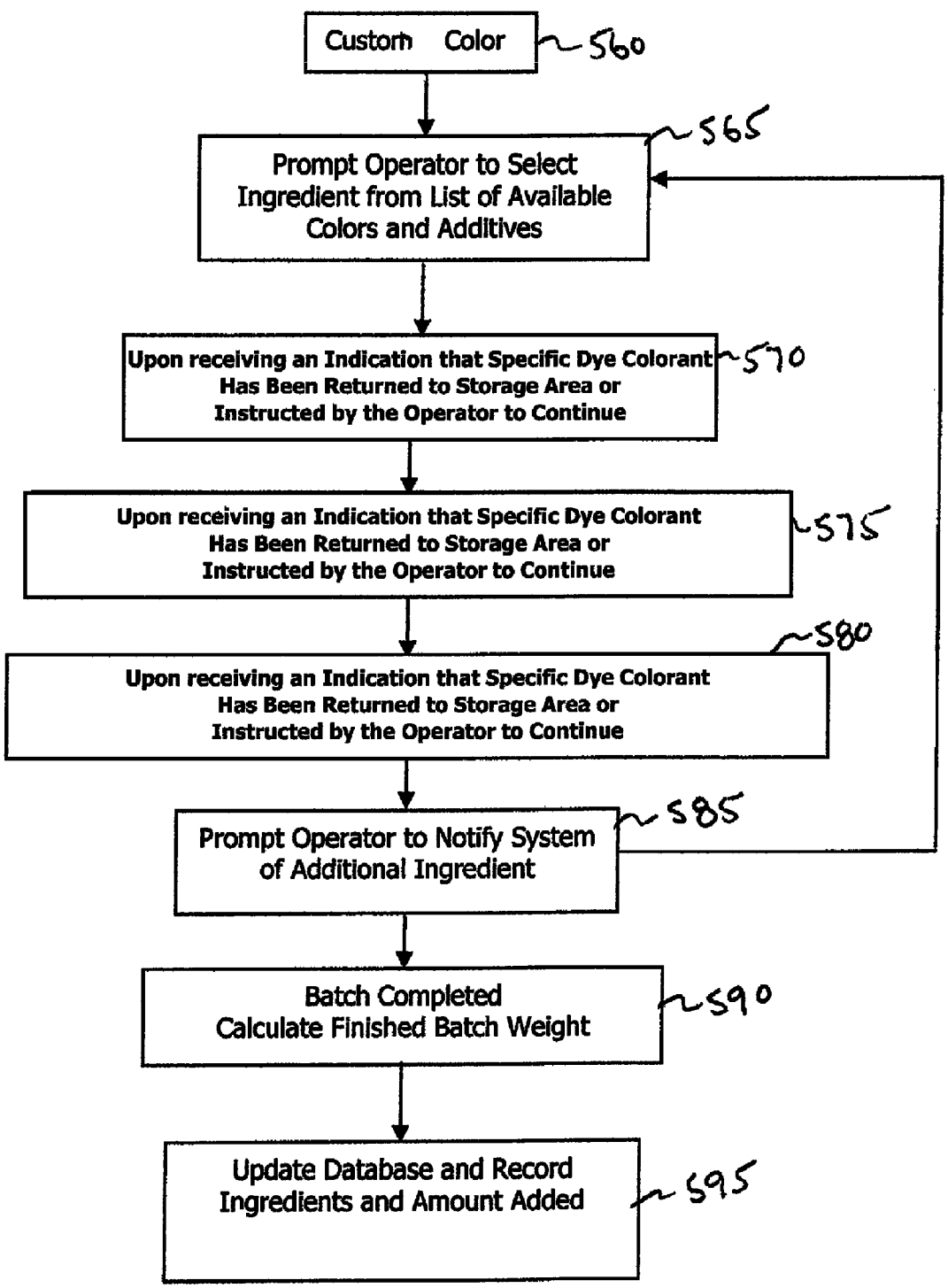
FIG. 14 is a flow diagram of one embodiment illustrating the creation of a custom color.

The present embodiment has one or more of the following benefits over prior art systems: eliminates blending errors; the system ensures color accuracy; the simple, controlled process produces perfect results regardless of skill level or experience; the system maintains a customer history, so customer color formulations can be precisely repeated time after time; using the system, even custom color formulation are recorded for future reference; the system makes color control independent of the operator, so should a colorist leave a salon, the exact color can be recreated; the scale coupled the control software can correct for over dispensed ingredients preventing wasted materials and off-shades; the system is compatible with current manufacturing processes and product packaging; the system brings tidiness and organization to an otherwise very messy process and save counter space; and the control software can track material usage to help eliminate shrinkage and provides a tool to estimate future needs Referring now to FIGS. 14 and 15, in another aspect of the present invention, the control system would control the display to indicate a remaining weight during the manual dispensing of the dye. As the dye is being added to the bowl 245, the display 255 could be indicated how much dye needs to be added, by counting up or down to the target weight. Analog indicator will be displayed to more effectively communicate the remaining material to be added. When the operator presses the next on the system, the system would illuminate the next LED and also recalibrate the scale to zero and indicate to the operator how much of the next dye needs to be added. Again, as the operator adds the next dye, the system leads the operator through the blending process.

An optional barcode scanner 450 could be provided to verify the correct color paste SKU prior to use. The bar code scanner may also help keep track of the product and make sure the operator is using the correct product. For example, if the system identifies a particular product in a particular bin, the operator after retrieving the product would scan the product. The system would check to make sure the actual product scanned is the correct product identified by the system for use. Other types of scanning equipment may be employed such as RFID scanners.

In other aspects of the invention the system 475 may have separate bin storage areas 480, shown in FIGS. 14 and 16. In a more modular system setup, the separate bin storage areas 480 and the main console area 475 would communicate either wirelessly or through wired connections. This would allow the main console 475 to communicate and direct the bin storage areas 480 to turn on and off the LED indicators 485, to illustrate which bin to retrieve the dye/colorant tubes 490 from; and if included keep track of the quantities of dye tubes for re-ordering purposes. In addition, it would thus be possible to just use the main console without the storage bins or base dispensing apparatus (shown in FIG. 13).

In another embodiment of the present invention, the system 100 may be used in conjunction with a salon management software package. The elements of a basic salon management package would be shared by the system application including the ability to access and share customer data, customer history, and inventory data.

Most available salon management software packages maintain basic customer data such as name, telephone number, email address, etc. History data would include service date, services provided, stylist, notes and perhaps photographs. Many of the salon management software packages use text fields for notes which is the only provision to store color recipe data. The system will maintain a separate dispense history file, but will be capable of sharing this information with the salon management software packages for inclusion with customer history records. In addition, as many salon management software packages have inventory modules, product usage would need to be reported.

Figure 13:
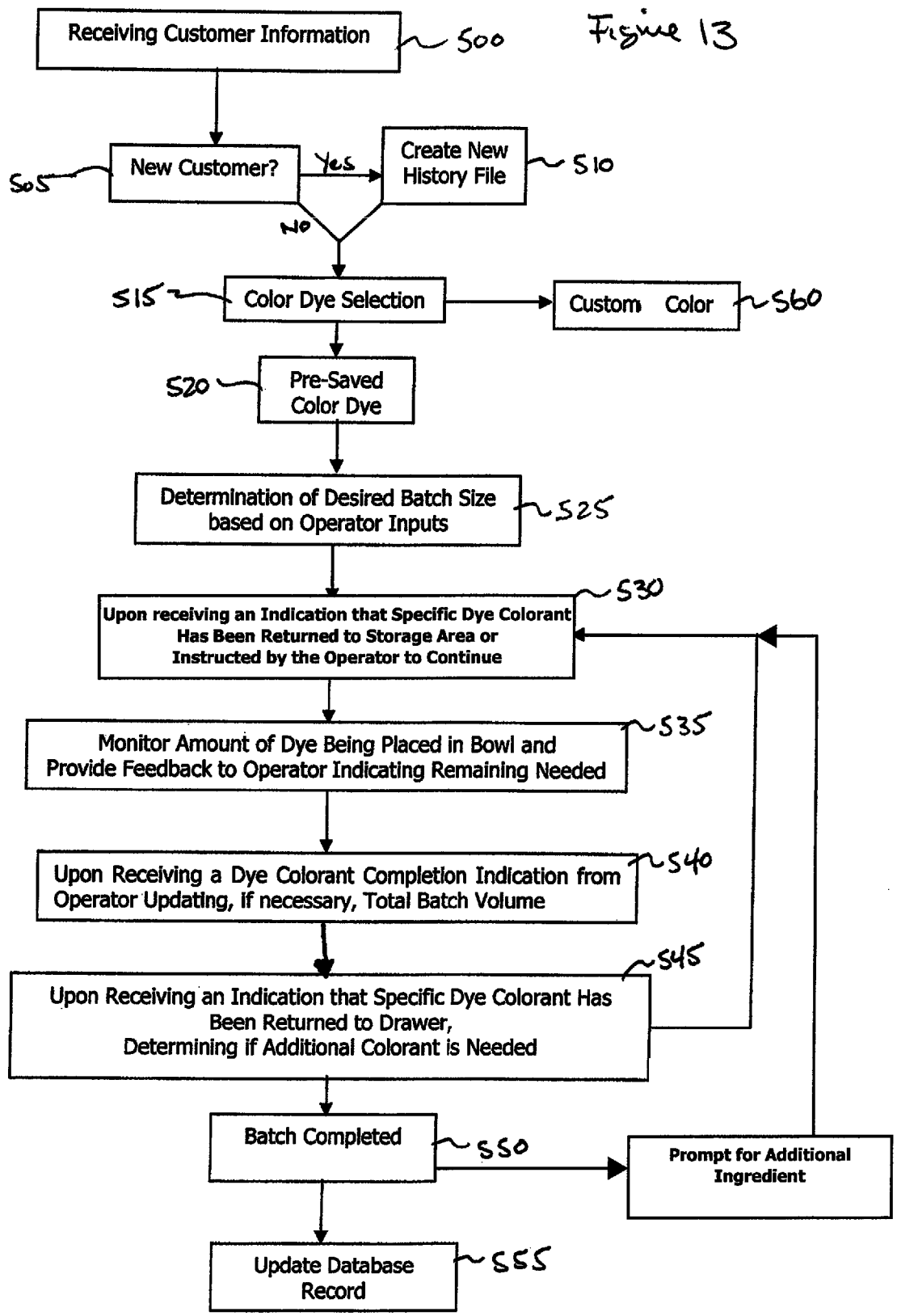
FIG. 13 is a flow diagram of one embodiment illustrating the manual creation of a hair dye batch from a pre-saved formula.

Referring now generally to FIGS. 13 and 14 one or more of the present embodiments will be referenced in the given flow diagrams to illustrate various inputs and outputs from a given system.

In use with one or more of the present embodiments and an available salon management software, operation of the system could typically follow in the following steps:

(a) an operator enters the customer name or other identifying characteristic (ie telephone number, etc.) into the control system, BOX 500;

(b) the control system would display the customer's history information; However, if this is a new customer (BOX 505)*r*, the control system would permit the operator to create a new history file (BOX 510);

(c) the operator then selects desired dye color, BOX 515, from the available color pallet which is stored within a formulation database (BOX 520) (if the salon management software packages has a color pallet database, the control system would be linked to it so the color pallet could be read and interpreted by the control system;

(d) the system then prompts for the required amount or size of finished dye;

(e) the system may then prompt for an activator strength;

(f) the stock color recipe is mathematically scaled for the desired batch size and the selected activator strength is displayed, BOX 525;

(g) the operator is prompted to place an empty mixing bowl on the scale;

The system will compare actual weight of the bowl against a target range value—this range of values is to be user definable. If the set range is 0 to 0, the no validation will occur. The control system will contain a maximum weight for the mixing bowl to allow sufficient fluid capacity and stay below the maximum scale capacity. For example, if the maximum scale capacity is 1,200 grams, and the batch size calls for 600 grams of dye components, then the maximum possible weight of the mixing bowl would be 600 grams. However, to allow for batch correction capability, the calculation should assume a 50% dye component weight variation (I.e. of 600 grams, plus variation=900 grams leaving a maximum bowl weight of 300 grams) Enforcing a maximum bowl value ensures sufficient scale capacity for color mixing.

(h) if the correct bowl weight value is achieved, the control system will prompt for the first dye color, BOX 530.

If no validation is to be made, or the value is outside of the range, a control system will cause a message to be displayed, and the operator will be prompted to proceed or cancel. If the bowl is above the maximum allowable, a caution message should be displayed.

(i) as the first dye color is prompted, an LED adjacent to the corresponding bin/drawer is illuminated so the operator can quickly locate the desired ingredient (for systems with optional storage system);

(j) if optional door locks have been included, and unlocking signal is provided to the corresponding solenoid. For reference, this optional feature would only allow drawers which were un-locked by the system to be opened. This provides two features: (a) prevent inventory theft and/or (b) force the operator to use the system—operators can't get inventory otherwise. This ensures that all transactions are recorded and properly accounted for in the systems history files.

(k) the weight of the mixing bowl is internally recorded for use in measurement calculation, and a digital value of 0.0 grams is displayed to indicate the amount of ingredient 1 that has been added;

(l) the operator manually adds the amount indicated on the display panel, while the scale monitors exactly how much has been added and provides user feedback via the analog and/or digital indicators, BOX 535

(m) a color-coded analog bar-graph scale is displayed that shows the progress of the first ingredient being added. As material is added, the analog bar-graph scale changes color from green to yellow, to orange and finally to red. Green being the starting point, yellow to indicate the operator is nearing the target weight, orange is very close, and red meaning stop;

(n) the control system will compare the actual dispensed amount to establish accuracy standards. When the calculated minimum amount of an ingredient has been reached, the ingredient will be considered complete and the analog display will turn red. If the volume added is greater than the maximum allowed value; the user will be prompted to "accept", or "correct" the batch. If "correct" is selected, the total batch volume will be re-calculated based on the amount of the discrepancy, BOX 540. All corresponding weights will be increased accordingly. If other ingredients had been added to the batch prior to the over-dispense, the system will automatically prompt the operator to add additional amounts of these ingredients as required. When the correct add has been completed, the operator is prompted to return the bottle or tube to the storage bin (if applicable) and to press a or any key to continue.

(o) the control system would then prompt the operator to the second dye color by illuminating the LED adjacent to the corresponding bin/drawer. Similarly, if optional door locks have been included, and unlocking signal is provided to the corresponding solenoid.

(p) the current weight of the mixing bowl is internally recorded for use in measurement calculation, and a digital value of 0.0 grams is displayed to indicate the amount of ingredient 2 that has been added. The operator repeats steps (l) through (n) for all manually weighed ingredients (BOX 545).

(q) if the system is equipped with "automatic additive dispensing" the control system will automatically dispense the desired activator or base. The dispensing function is performed gravimetrically (using the scale). If more than one ingredient is to be added, they will be dispensed sequentially.

(r) when all ingredients have been added, the operator will be prompted to remove the mixing bowl (Box 550); a database record is created with the precise amount of each ingredient dispensed and the record is stored in the history file (Box 555). A record containing the color name, amount, time and date is created and can be passed to the salon management software package in order for the salon management software package attach the information as a note to the custom record file.

(s) in addition, a record of the amount of each ingredient used will be maintained in the control system for inventory tracking purposes. The operator will have the ability to query the control system to determine the amount of each ingredient for a given time period. The system should also be capable of passing usage values to the salon management software package if necessary.

In instances where the operator would be creating a new color mixture for a customer (FIG. 14), the operator would have the option to create a new color (BOX 560), which would be selected to start the appropriate software section of the control system. The operation would follow similar steps to the above, except instead of notifying the operator which color to use, the control system would prompt the operator to select the first ingredient from an on-screen list of available colors and/or additives (BOX 565). After the selection is made, an LED adjacent to the corresponding bin is illuminated to provide the operator with an identification of where the color can be located (BOX 570). If optional door/drawer locks have been included, and unlocking signal is provided to the corresponding solenoid.

The tare weight of the mixing bowl is internally recorded for use in measurement calculation, and a digital value of 0.0 grams is displayed to indicate the amount of ingredient 1 that has been added. The operator manually adds the desired amount of the first ingredient, while the corresponding reference weight is displayed (BOX 575). When the addition is complete, the user selects "next." The operator is prompted to return the bottle or tube to the storage bin (if applicable) and to "Press any key to Continue." (BOX 580) The display would show the name of the first ingredient, and the amount added to the formula. The operator is prompted to select the second ingredient from an on-screen list of available colors and/or additives (BOX 585). If optional door/drawer locks have been included, and unlocking signal is provided to the corresponding solenoid. The tare weight of the mixing bowl is internally recorded for use in measurement calculation, and a digital value of 0.0 grams is displayed to indicate the amount of ingredient two that has been added. The operator manually adds the desired amount of the second ingredient, while the corresponding reference weight is displayed. When the addition is complete, the user selects "next." The display shows the names of the first two ingredients, and the amount of each added to the formula. This would continue until all of the required ingredients have been added. When the last ingredient has been added, the operator selects "done" (BOX 590). Upon completion, a total batch volume will be calculated based on the specific gravity of the individual ingredients. This value is stored for future reference to permit batch size scaling of the recipe. A database record is created with the precise amount of each ingredient dispensed and is stored in the history file within the control system (BOX 595). A text record containing the color name, amount, time and date is created and passed to the salon management software package to be attached as a note to the custom record file. A record of the amount of each ingredient used will be maintained in the control system for inventory tracking purposes. A simple query should be available to determine the amount of each ingredient for a given time period.

In addition, raw material inventory management functionality with and without the use of optional barcode equipment may be provided by one or more of the present embodiments. Barcode scanning devices simplify inventory management functions. By using an attached barcode scanner, color blending ingredient can be easily identified for inventory tracking purposes. The functions could be two-fold. One, an on-hand inventory could be established by scanning all available product inventory items. When new shipments are received, they too could be scanned thereby easily adding them to the on-hand inventory. Secondly, when systems are equipped with the optional storage bins, scanning the tube could also be used to illuminate the appropriate bin lamp, or unlock the corresponding door. This functionality will help to ensure that the materials are properly stored and further minimizes the potential for selecting the wrong material during subsequent mixing operations.

In additional embodiments, the system may track the operator(s) use of the system which allows cost reporting by employee. It would also accurately track third party billing for "chair rental" environments. In many salons, some of the stylists are not direct employees, but rather rent a chair from the salon owner. Sometimes the stylist renting a chair provides their own materials, such as hair color, and some utilize materials from the salon. Since the system would know the exact amount of each ingredient included in a blend, it has the ability to establish the exact material cost for each batch. This data can be used to better understand service costs and can also be used to provide billing data for "rental chair" staff.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover all such modifications.

We claim:

1. A system for manually preparing a hair dye mixture, the system comprising:
a control system having at least a memory, input controls, and a display;
at least one formula stored in said memory, the formula defining instructions of one or more colorants and/or dye blending materials and amounts recommended for manually recreating a hair dye mixture;
a scale in communication with the control system;
software for displaying the instructions on said display in response to a manual input from the input controls, and monitoring software to monitor a weight on the scale;
formula adjusting software configured to adjust the formula of the hair dye mixture when a weight of a colorant or dye blending material being manually added to the scale is different than the amount recommended in the formula such that the formula adjusting software is configured to define an adjusted formula; and
the formula adjusting software is further configured to display the adjusted formula on said display whereby a user is able to make corrections to the colorants and/or dye blending materials in accordance with the adjusted formula.

2. The system of claim 1, wherein the formula adjusting software adjusts the formula when a manual input is received by the input controls to accept a weight of the colorant or dye blending material on the scale.

3. The system of claim 1, wherein the monitoring software monitors changes in the weight on the scale and the control system calculates a difference between a recommended formulated amount of a colorant or dye blending material and an actual amount of the colorant or dye blending material added to the scale.

4. The system of claim 3, wherein the difference is measured down to a zeroed amount left to indicate how much additional colorant or dye blending material is needed to be added to the scale to reach the recommended formulated amount of the colorant.

5. The system of claim 1, wherein the control system is in communication with a salon management software to exchange information on customers and formulas of hair dye mixtures associated to said customers.

6. The system of claim 1, wherein the control system includes software to store in the memory any adjustments to the formula of the hair dye mixture.

7. The system of claim 5, wherein the control system includes software to store in the memory any adjustments to the formula of the hair dye mixture and includes software to send the adjustments to the formula of the hair dye mixture to the salon management software.

8. The system of claim 1, wherein the formula adjusting software adjusts the formula of a hair dye mixture upon receiving an initial input on a change to a total amount of mixture needed or a change to a strength of the mixture needed.

9. The system of claim 1, wherein upon receiving an input that the hair dye mixture is a new custom color, the control system further displays a listing of colorants and dye blending materials, monitors a separate amount and a total amount of any colorant(s) and/or dye blending materials) placed in a receptacle, and stores a formulated hair dye mixture upon receiving an input the mixture is completed.

10. A system for manually preparing a hair dye mixture, the system comprising:
- a control system having at least a memory, input controls, and a display;
- at least one formula stored in said memory, the formula defining instructions of one or more colorants and/or dye blending materials and amounts recommended for manually recreating a hair dye mixture;
- a scale in communication with the control system;
- software for displaying the instructions on said display in response to a manual input from the input controls, and monitoring software to monitor a weight on the scale;
- formula adjusting software to adjust the formula of the hair dye mixture when a weight of a colorant or dye blending material being manually added to the scale is different than the amount recommended in the formula; and
- wherein the formula adjusted by the formula adjusting software is stored in the memory or displayed by the displaying software whereby a user is able to make corrections to the colorants and/or dye blending materials in accordance with the formula adjusted by the formula adjusting software to recreate the hair dye mixture, and
- wherein the control system further includes software to display a color-coded analog bar-graph representing one or more of the colorant(s) and/or dye blending material(s) from the hair dye mixture, and includes software to change the color-coded analog bar-graph to indicate an amount being added to the scale.

11. The system of claim 1, wherein the control system recalibrates the scale to a zero weight when the control system receives an input indicating that a previous hair dye component added to the hair dye mixture is completed and the next hair dye component in the formula of the hair dye mixture is required to be added.

12. The system of claim 1 further comprising a validation software to check a hair dye component packages against the hair dye component(s) in the formula to ensure and validate a user is accurately manually recreating the hair dye mixture.

13. A system for preparation of a hair dye mixture, the system comprising:
- a computer control system having at least a memory, input controls, and a display;
- at least one formula stored in said memory, the formula defining instructions of one or more colorants and/or dye blending materials and target amounts recommended for manually recreating a hair dye mixture;
- a scale connected to the control system;
- monitoring software to monitor a weight on the scale; and
- software configured to display a color-coded analog bar-graph representing one of the colorants or dye blending materials from the hair dye mixture, and said software further configured to change a color of the color-coded analog bar-graph to indicate an amount of the colorant or dye blending material being added to the scale as the amount approaches the target amount recommended by the formula.

14. The system of claim 13, wherein the monitoring software monitors changes in the weight on the scale and the control system calculates a difference between a recommended formulated amount of a colorant or dye blending material and an actual amount of the colorant or dye blending material added to the scale.

15. The system of claim 14, wherein the difference is measured down to a zeroed amount, adjusted for a weight of the receptacle, to indicate how much additional colorant or dye blending material is needed to be added to the scale to reach the recommended formulated amount of the colorant.

16. The system of claim 1, wherein the formula adjusting software is further configured to store in the memory any changes in the formula of the hair dye mixture.

17. The system of claim 16, wherein the control system is linked to a salon management software to exchange information on customers and formulations of hair dye mixtures associated to said customers.

18. The system of claim 17, wherein the control system includes software to store in the memory any changes in the formula of the hair dye mixture and includes software to send the changes in the formula of the hair dye mixture to the salon management software.

19. The system of claim 1, wherein the formula adjusting software is further configured to adjust the formula of a hair dye mixture upon receiving an initial input on a change to a total amount of mixture needed or a change in a strength of the mixture needed.

20. A system for preparation of a hair dye mixture, the system comprising:
- a computer control system having at least a memory, input controls, and a display;
- at least one formula stored in said memory, the formula defining instructions of one or more colorants and/or dye blending materials and amounts recommended for manually recreating a hair dye mixture;
- a scale connected to the control system;
- monitoring software to monitor a weight on the scale; and
- software for displaying on said display an amount of the colorant(s) and/or dye blending material(s) required to be manually added to the scale and software for indicating on said display the recommended amounts in comparison to the amount that has been added to the scale, and
- wherein upon receiving an input that the hair dye mixture is a new custom color, the control system further displays a listing of colorants and dye blending materials, monitors a separate amount and a total amount of any colorant(s) and/or dye blending material(s) placed in a receptacle, and stores a formulated hair dye mixture upon receiving an input the mixture is completed.

21. The system of claim 13, wherein the control system recalibrates the scale to a zero weight when the control system receives an input indicating that a previous hair dye component added to the hair dye mixture is completed and the next hair dye component in the formulation of the hair dye mixture is required to be added.

22. A system for preparation of a hair dye mixture, the system comprising:
- a computer control system having at least a memory, input controls, and a display;
- at least one formula stored in said memory, the formula defining instructions of one or more colorants and/or dye blending materials and amounts recommended for manually recreating a hair dye mixture;
- a scale connected to the control system;
- monitoring software to monitor a weight on the scale;
- software for displaying on said display an amount of the colorant(s) and/or dye blending material(s) required to be manually added to the scale and software for indicating on said display the recommended amounts in comparison to the amount that has been added to the scale; and
- a software to validate a hair dye component packages being used against the hair dye component(s) in the formulation to ensure and validate accurate re-creation of the hair dye mixture.

23. A system for manually preparing a hair dye mixture, the system comprising:
- a control system having at least a memory, input controls, and a display;
- at least one formula stored in said memory, the formula defining instructions of one or more colorants and/or dye blending materials and amounts recommended for manually recreating a hair dye mixture;
- a scale in communication with the control system;
- software for displaying the instructions on said display in response to a manual input from the input controls;
- monitoring software to monitor a weight on the scale;
- formula adjusting software to adjust the formula of the hair dye mixture when a weight of a colorant or dye blending material being manually added to the scale is different than the amount recommended in the formula;
- wherein the formula adjusted by the formula adjusting software is stored in the memory or displayed by the displaying software whereby a user is able to make corrections to the colorants and/or dye blending materials in accordance with the formula adjusted by the formula adjusting software to recreate the hair dye mixture; and
- wherein the control system is in communication with a salon management software to exchange information on customers and formulas of hair dye mixtures associated to said customers.

24. The system of claim 23, wherein the control system includes software to store in the memory any adjustments in the formula of the hair dye mixture and includes software to send said adjustments in the formula of the hair dye mixture to the salon management software.

25. The system of claim 23, wherein the formula adjusting software adjusts the formula when a manual input is received by the input controls to accept a different weight of the colorant or dye blending material.

26. The system of claim 23, wherein the formula adjusting software adjusts the formula of a hair dye mixture upon receiving an initial input on a change to a total amount of mixture needed or a change to a strength of the mixture needed.

27. The system of claim 23 further comprising:
- a custom color software, which when upon receiving a manual input from the input control for a creation of a hair dye custom color mixture, the custom color software, prompts a user to select or enter one or more colorants and/or dye blending materials and monitors the scale for an amount corresponding to said one or more colorants and/or dye blending materials, and creates and stores a hair dye mixture formula based upon the selected or entered colorants and/or dye blending materials and the corresponding amounts.

28. The system of claim 23, wherein the control system includes software to store in the memory any adjustments in the formula of the hair dye mixture and includes software to send the adjustments in the formula of the hair dye mixture to the salon management software.

29. The system of claim 23, wherein the control system recalibrates the scale to a zero weight, adjusted for a weight of a receptacle, when the control system receives an input indicating that a previous hair dye component added to the hair dye mixture is completed and the next hair dye component in the formulation of the hair dye mixture is required to be added.

30. A method for manually preparing a hair dye mixture, the method comprising:
- providing a scale and control system in communication with each other, and having the control system provide for at least a memory, input controls, and a display;
- storing in said memory at least one formula, the formula defining instructions of one or more colorants and/or dye blending materials and amounts recommended for manually recreating a hair dye mixture;
- displaying the instructions on said display in response to a manual input from the input controls;
- monitoring a weight on the scale as a colorant or dye blending material is manually added to the scale;
- adjusting the formula of the hair dye mixture when a weight of a colorant or dye blending material being manually added to the scale is different than the amount recommended in the formula; and
- displaying an adjusted formula on said display whereby a user is able to make corrections to the colorants and/or dye blending materials in accordance with the adjusted formula.

* * * * *